(12) United States Patent
Ding et al.

(10) Patent No.: US 9,587,388 B2
(45) Date of Patent: Mar. 7, 2017

(54) FLUSH TYPE TOILET BOWL AND DEVELOPED PORTABLE TOILET THEREOF

(71) Applicant: QINGDAO CHUANGHUI INDUSTRY CO.,LTD., Qingdao, Shandong (CN)

(72) Inventors: Limin Ding, Shandong (CN); Jinning Ding, Shandong (CN); Jinghe Wang, Shandong (CN); Guifen Bai, Shandong (CN)

(73) Assignee: QINGDAO CHUANGHUI INDUSTRY CO., LTD., Qingdao, Shandong (CN)

( * ) Notice: Subject to any disclaimer, the term of this patent is extended or adjusted under 35 U.S.C. 154(b) by 272 days.

(21) Appl. No.: 14/366,264

(22) PCT Filed: Mar. 25, 2013

(86) PCT No.: PCT/CN2013/073153
§ 371 (c)(1),
(2) Date: Jun. 18, 2014

(87) PCT Pub. No.: WO2014/146307
PCT Pub. Date: Sep. 25, 2014

(65) Prior Publication Data
US 2015/0082528 A1    Mar. 26, 2015

(30) Foreign Application Priority Data
Mar. 19, 2013    (CN) .......................... 2013 1 0088177

(51) Int. Cl.
*E03D 5/02*    (2006.01)
*B60R 15/04*    (2006.01)
(Continued)

(52) U.S. Cl.
CPC .............. *E03D 5/024* (2013.01); *B60R 15/04* (2013.01); *E03D 5/01* (2013.01); *E03D 11/13* (2013.01); *E03D 9/00* (2013.01); *E03D 11/16* (2013.01)

(58) Field of Classification Search
CPC  E03D 5/01; E03D 5/024; E03D 11/13; E03D 11/135; E03D 11/16; E03D 11/17;
(Continued)

(56) References Cited

U.S. PATENT DOCUMENTS 1,426,950 A * 8/1922 Bollow .................... E03D 11/13
                                                                 220/327
3,846,847 A * 11/1974 Tufts ........................ E03D 11/11
                                                                 4/317
(Continued)

*Primary Examiner* — J. Casimer Jacyna
(74) *Attorney, Agent, or Firm* — Kile Park Reed & Houtteman PLLC

(57) ABSTRACT

The invention claims a flush type toilet bowl, comprising a toilet bowl provided with a toilet inlay therein, wherein an elastic ring, a clamping ring and a J-shaped sealing ring are arranged under the toilet bowl drainage hose in sequence, and a nut is further equipped for sealing the end faces of the toilet bowl and the toilet inlay; the toilet bowl is provided with a cavity for containing the clean water and a double water spray jets extended out from the water-jet nozzle; the cavity is provided with a hose connected with the four-way valve, the water-jet nozzle and the hand-pressed air pump, next to the air pump is a button with which you can flush the toilets by pressing it easily. The invention is developed as the gravity flush portable toilet and the cassette portable toilet by using the flush type toilet bowl as the basic universal part, thereby being used on the caravans. The cassette toilet is provided with the waste level indicator, the sealing valve and the handle performing perfect use under the condition without water and electricity. The toilet bowl and the developed toilet thereof in the invention can be interchanged excel-
(Continued)

lently and cleaned or flushed conveniently without outside water source, furthermore, the invention is excellent in rigidity, impact resistance and tightness.

12 Claims, 5 Drawing Sheets

(51) Int. Cl.
*E03D 11/13* (2006.01)
*E03D 5/01* (2006.01)
*E03D 9/00* (2006.01)
*E03D 11/16* (2006.01)

(58) Field of Classification Search
CPC ......... E03D 11/00; E03D 11/06; E03D 11/08; E03D 11/10; E03D 11/11; B60R 15/04
USPC ............................................ 4/321, 323, 362
See application file for complete search history.

(56) References Cited

U.S. PATENT DOCUMENTS

| | | | | |
|---|---|---|---|---|
| 3,860,973 | A * | 1/1975 | Uyeda | E03D 11/10 4/332 |
| 3,939,500 | A * | 2/1976 | Miller | E03D 11/10 4/332 |
| 6,332,229 | B1 * | 12/2001 | O'Malley | E03D 5/08 4/325 |
| 6,397,405 | B1 * | 6/2002 | Grech | E03D 3/00 4/420 |
| 2008/0276362 | A1 * | 11/2008 | O'Malley | E03D 5/012 4/420 |
| 2014/0062035 | A1 * | 3/2014 | Coronado | E03D 11/16 277/607 |
| 2015/0152628 | A1 * | 6/2015 | Hirai | E03D 5/00 4/420 |

* cited by examiner

FLUSH TYPE TOILET BOWL AND DEVELOPED PORTABLE TOILET THEREOF

FIELD OF THE INVENTION

The invention relates to the technical field of the sanitary ware, specifically to a flush type toilet bowl and developed portable toilet thereof.

BACKGROUND OF THE INVENTION

As everyone knows, the popular toilets in the market are mainly made of the ceramic that makes them heavy and inconvenient and unable to meet the defecation demands in the tour or wild, therefore, the flush type toilet convenient to move and carry is emerged as the times require. Currently, the movable portable flush type toilet is mainly installed on the caravans or other mobile tools and mainly divided into the gravity-flush toilet and cassette toilet.

These two types of toilets are independent systems without shared resources, so it is hard to interchange, thereby increasing the production and research cost and repair and change difficulty in the later stage. Meanwhile, these systems have no the water-storing function and need outside water source, which makes them hard to use under the condition without water and electricity, for instance, the wild and temporary houses. The toilet is flushed from the rear centre part of the toilet bowl to the two sides, ignoring the middle downward part, it is hard to clean the toilet.

Besides, the toilet bowl of the gravity-flush toilet is simply buckled by two half parts, having bad impact resistance and low production efficiency. The sealing component at the downward drainage port of the toilet is fixed unstably and easy to fall down. The stage in the sealing ring makes the dirt detained and hard to remove. The sealing ball valve is rotated by the pedal or lever, this irrational design cannot guarantee the tightness. Furthermore, the double sealing is required between the toilet and the base thereof, but the leakage is also possible with insufficient rigidity.

The base of the cassette toilet under the current technology is composed of two side plates, a bottom plate, a top plate and a rear plate, which is complex. The waste holding tank is heat sealed by two half injection housings, thereby having bad impact resistance, damaged and leaks easily.

SUMMARY OF THE INVENTION

To solve above-mentioned disadvantages, the invention discloses a flush type toilet bowl and developed portable toilet thereof, using the flush type toilet bowl as the basic universal component and developing the gravity-flush toilet and cassette toilet, having good interchangeability, rigidity, impact resistance and tightness, needing no outside water source, and being convenient to clean and flush.

In order to realize said target, the invention uses the following technical solution: a flush type toilet bowl, comprising a toilet bowl, and a toilet inlay located in the toilet bowl downwards by using a semicircular structure on a drainage hose of the toilet inlay as the location reference, wherein the drainage hose of the toilet inlay is extended out from a toilet bowl drainage hose, the lower end of which is provided with an elastic ring, a clamping ring and a J-shaped sealing ring in sequence; threads are arranged out of the toilet bowl drainage hose and equipped with a nut for fixing the elastic ring, the clamping ring and the J-shaped sealing ring on the toilet bowl and pressing them on the end face of the drainage hose of the toilet inlay so as to seal the end face of the toilet inlay; a cavity containing the clean water is formed between the inner cavity on the lower part of the toilet bowl and the lower part of the toilet inlay; an annular platform of the toilet inlay is matched with an inner hole of the toilet bowl and equipped with a double water spray jets; a hose is arranged in the toilet bowl, one end of the hose is provided with a water-jet nozzle extended out from the water-jet nozzle of the toilet bowl, while the other end of the hose is provided with a four-way valve connected with the cavity containing clean water; a hand-pressed air pump is located on the rear part of the toilet bowl and connected with the four-way valve; next to the air pump is a button with which you can flush the toilets by pressing it easily.

Furthermore, the upper end of the nut is provided with an anti-loosening and non-return structure, while a non-return structure is located at the corresponding part on the bottom of the toilet bowl; the nut is fixedly connected with the toilet bowl by the anti-loosening and non-return structure and the non-return structure so as to keep tight all the time.

Furthermore, two standard bolt holes are reserved for a toilet seat and lid on the rear part of the toilet, which are fixed tightly on the toilet by the bolts.

Furthermore, the toilet bowl is formed by the one-step blow molding way.

Furthermore, the toilet inlay is made of the highly imitated ceramic abrasion-proof material.

The invention discloses a gravity flush portable toilet developed from the flush type toilet bowl, wherein the lower end of the toilet bowl is equipped with a gravity-flush base which is provided with a cavity hole, a side hole and a drainage hole in sequence from top to bottom; the toilet bowl drainage hose and the nut are sunk in the cavity hole equipped with an arc-shaped spherical valve therein that sealed with the J-shaped sealing ring; rotating shafts are formed on the lower part of the arc-shaped spherical valve and inserted in the side hole; one of the rotating shafts is connected with a pedal in crossed fixation; the pedal is installed with a returning spring, one end of which supports the end face of the rotating shaft while the other end supports the inner cavity surface of the side hole; the pedal is also provided with a shoulder supporting a stopping hook on the gravity-flush base so as to prevent the pedal from being fallen down.

Furthermore, the rotating shaft on the side provided with the pedal is provided with a sealing groove configured with the sealing ring therein and sealed with the side hole.

Furthermore, the lower part of the gravity-flush base is provided with an installation platform having bolt connection holes for fixing the gravity-flush base on the related platform and forming the gravity-flush toilet.

Besides, the invention further discloses a cassette portable toilet developed from the flush type toilet bowl, wherein the lower end of the toilet bowl is provided with a cassette base; the lower part of the toilet bowl is provided with a concave water-drop structure corresponding to a convex water-drop structure on the cassette base which is buckled with the concave water-drop structure by the convex water-drop structure; the middle part of the cassette base is provided with a hole with a shaft shoulder; an expanded compression ring is formed under the shaft shoulder; a compression ring is formed out of the nut which locks the expanded compression ring on the shaft shoulder via the compression ring so as to perform the fixed connection and mutual rotation between the cassette base and the toilet bowl; the bottom part of the cassette base hole is provided with a sliding rail; one side of the cassette base is provided with an opening door through which the waste holding tank can be put in or out easily; the upper middle part of the waste holding tank is provided with a sealing valve equipped with an eave-type valve ring that inserted in the sliding rail and matched with the sliding rail in sealing; the inner cavity of the valve ring is matched with the J-shaped sealing ring.

Furthermore, the sealing valve is provided with a handle dropping down for the gravity thereof and controlling the opening/closing of the sealing valve; the cassette base is provided with an opening window on the upper part opposite to the opening, and the handle is extended out from the opening window.

Furthermore, the waste holding tank is provided with a rotary pour spout and a spout cap.

Furthermore, the waste holding tank is provided with an upper handle and a middle handle.

Furthermore, the waste holding tank is provided with wheels.

Furthermore, the waste holding tank is provided with a waste level indicator and an air release valve assembly.

Furthermore, the opening of the cassette base features both a handle and a square metallic supporting frame for a strong rigidity.

Furthermore, the waste holding tank and the cassette base are formed by the one-step blow molding way.

The invention uses the flush type toilet bowl as the basic universal component and further develops the gravity-flush toilet and cassette toilet, having good interchangeability, strong generality, little investment, easy maintenance and simple production process. The developed toilet is convenient to carry. The flush type toilet bowl is provided with the water storing cavity, and the water-jet nozzle connected to the toilet inlay, so it is convenient to flush without outside water source, suitable for the caravans, the wild condition, the hospital, the mine, the camping, the ship, the military camp, the storehouse and the house without water and electricity. The toilet bowl, the toilet, the cassette base and the waste holding tank are formed by the one-step blow molding way, thereby having excellent rigidity, impact resistance and tightness.

DETAILED DESCRIPTION OF THE INVENTION

Referring now to the specific embodiments, there is shown further description of the invention.

Figure 1:
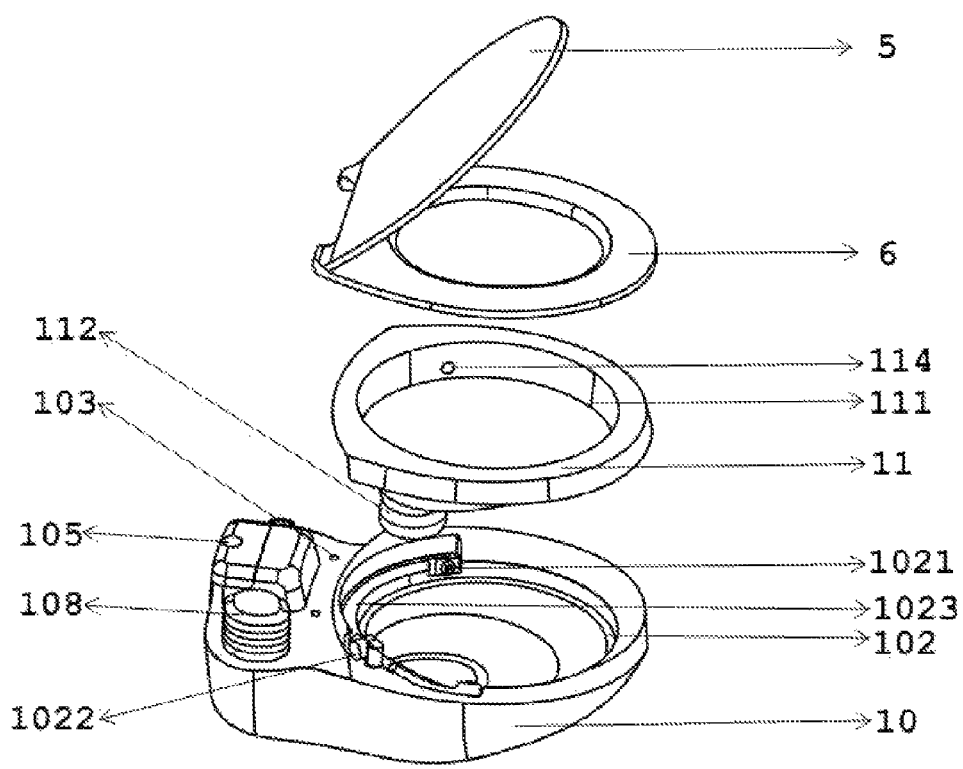
FIG. 1 is a structure diagram of the flush type toilet bowl of the present invention.
Figure 2:
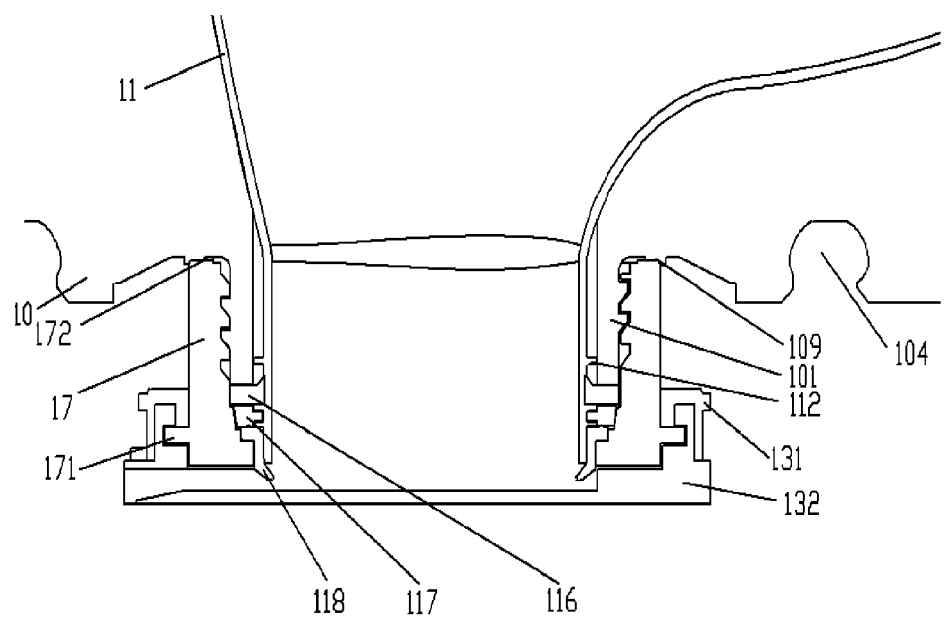
FIG. 2 is a structure diagram of the connection part between the toilet bowl and the toilet inlay of the flush type toilet bowl.

As illustrated in the FIG. 1 and FIG. 2, the flush type toilet bowl in the invention comprises a toilet bowl 10, and a toilet inlay 11 located in the toilet bowl 10 downwards by using a semicircular structure 112 on a drainage hose of the toilet inlay as the location reference, wherein the drainage hose of the toilet inlay is extended out from a toilet bowl drainage hose 101, the lower end of which is provided with an elastic ring 116, a clamping ring 117 and a J-shaped sealing ring 118 in sequence; threads are arranged out of the toilet bowl drainage hose 101 and equipped with a nut 17 for fixing the elastic ring 116, the clamping ring 117 and the J-shaped sealing ring 118 on the toilet bowl 10 and pressing them on the end face of the drainage hose of the toilet inlay 11 so as to seal the end face of the toilet inlay 11; a cavity containing the clean water is formed between the inner cavity on the lower part of the toilet bowl 10 and the lower part of the toilet inlay 11; an annular platform 111 of the toilet inlay 11 is matched with an inner hole 102 of the toilet bowl and equipped with an aperture 114; a water inlet hose 1023 is arranged in the toilet bowl 10, one end of the water inlet hose 1023 is provided with a water jet nozzle 1021, which is aligned with the aperture 114 and is extended out from the aperture 114 of the toilet bowl 10, while the other end of the water inlet hose 1023 is provided with a four-way valve 1022 connected with the cavity containing clean water; a hand-pressed air pump 108 is located on the rear part of the toilet bowl 10 and connected with the four-way valve 1022; one side of the hand-pressed air pump 108 is equipped with a button switch 105 for controlling the clean water flushing in the toilet bowl 10 by hands.

The upper end of the nut 17 is provided with an anti-loosening and non-return structure 172, while a non-return structure 109 is located at the corresponding part on the bottom of the toilet bowl 10; the nut 17 is fixedly connected with the toilet bowl 10 by the anti-loosening and non-return structure 172 and the non-return structure 109 so as to keep tight all the time.

Two standard bolt holes 103 are reserved for a toilet seat 6 and lid on the rear part of the toilet 10, which are fixed tightly on the toilet 10 by the bolts.

The toilet bowl 10 is formed by the one-step blow molding way of the hollow molding technique in one step, thereby having excellent rigidity, impact resistance and leakproofness, being used as the container for containing the clean water and performing the regular flushing with the self-stored water under the condition without water and electricity.

The toilet inlay 11 is made of the highly imitated ceramic abrasion-proof material.

Figure 3:
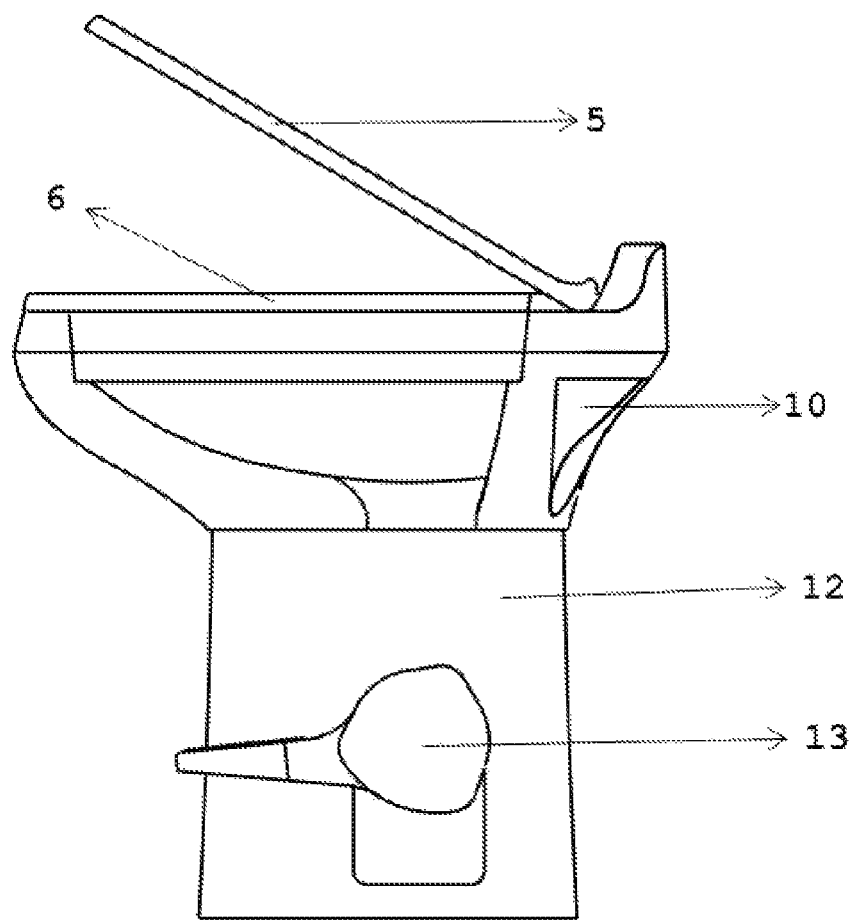
FIG. 3 is an overall view of the gravity flush portable toilet developed from the flush type toilet bowl.
Figure 4:
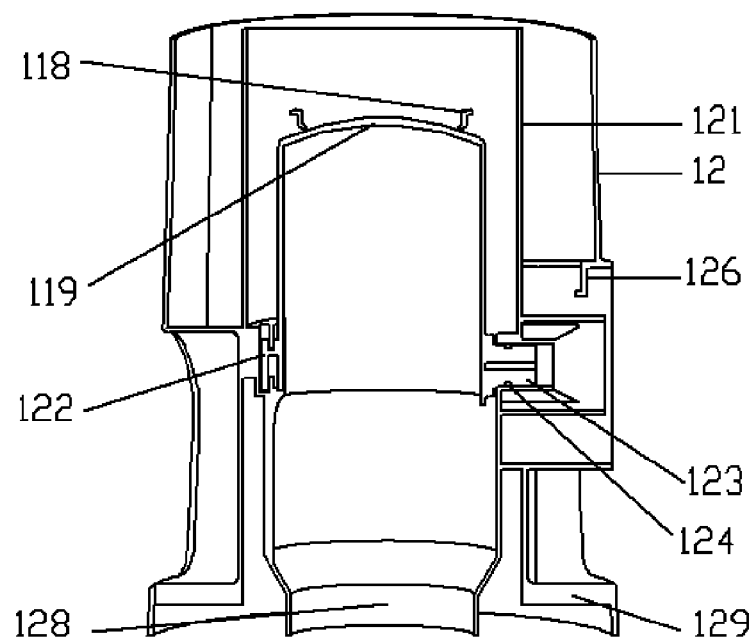
FIG. 4 is a structure diagram of the connection part between the flush type toilet bowl and the gravity-flush base.

As illustrated in the FIG. 3 and FIG. 4, the invention discloses a gravity flush portable toilet developed from the flush type toilet bowl, having the following technical solution: the lower end of the toilet bowl 10 is equipped with a gravity-flush base 12 which is provided with a cavity hole 121, a side hole 123 and a drainage hole 128 in sequence from top to bottom; the toilet bowl drainage hose 101 and the nut 17 are sunk in the cavity hole 121 equipped with an arc-shaped spherical valve 119 therein that sealed with the J-shaped sealing ring 118; rotating shafts 122 are formed on the lower part of the arc-shaped spherical valve 119 and inserted in the side hole 123; one of the rotating shafts 122 is connected with a pedal 13 in crossed fixation; the pedal 13 is installed with a returning spring, one end of which supports the end face of the rotating shaft 122 while the other end supports the inner cavity surface of the side hole 123; the pedal 13 is also provided with a shoulder 132 supporting a stopping hook 126 on the gravity-flush base so as to prevent the pedal 13 from being fallen down.

The rotating shaft 122 on the side provided with the pedal 13 is provided with a sealing groove 124 configured with the sealing ring therein and sealed with the side hole 123.

The lower part of the gravity-flush base 12 is provided with an installation platform 129 having bolt connection holes for fixing the gravity-flush base 12 on the related platform and forming the gravity-flush toilet.

Figure 5:
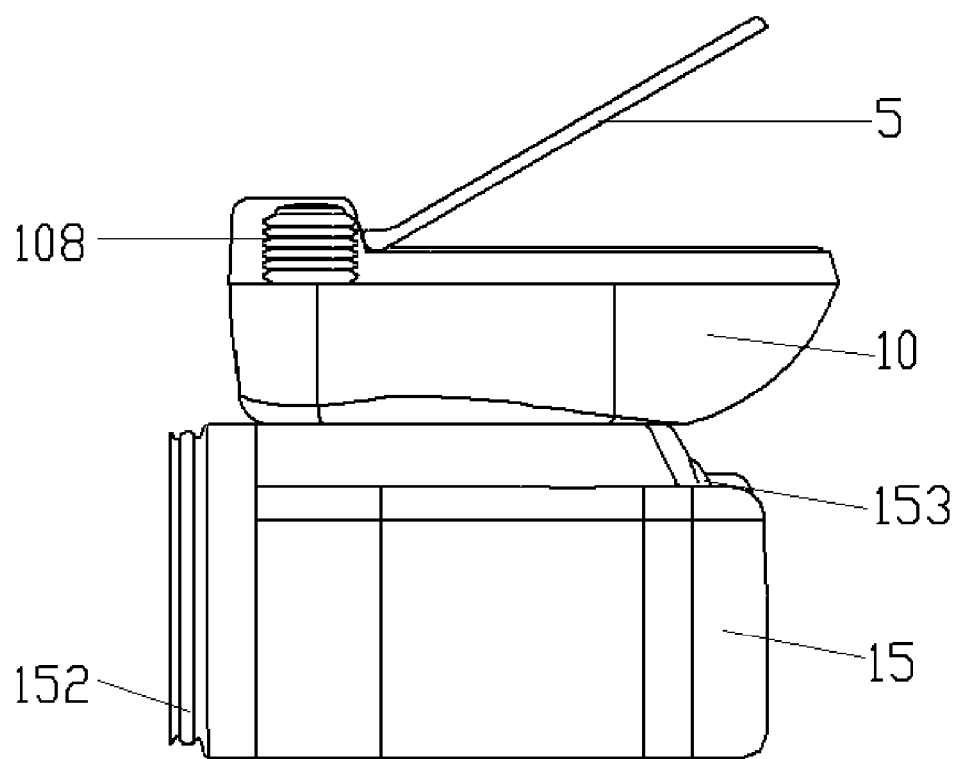
FIG. 5 is an overall view of the cassette portable toilet developed from the flush type toilet bowl.
Figure 6:
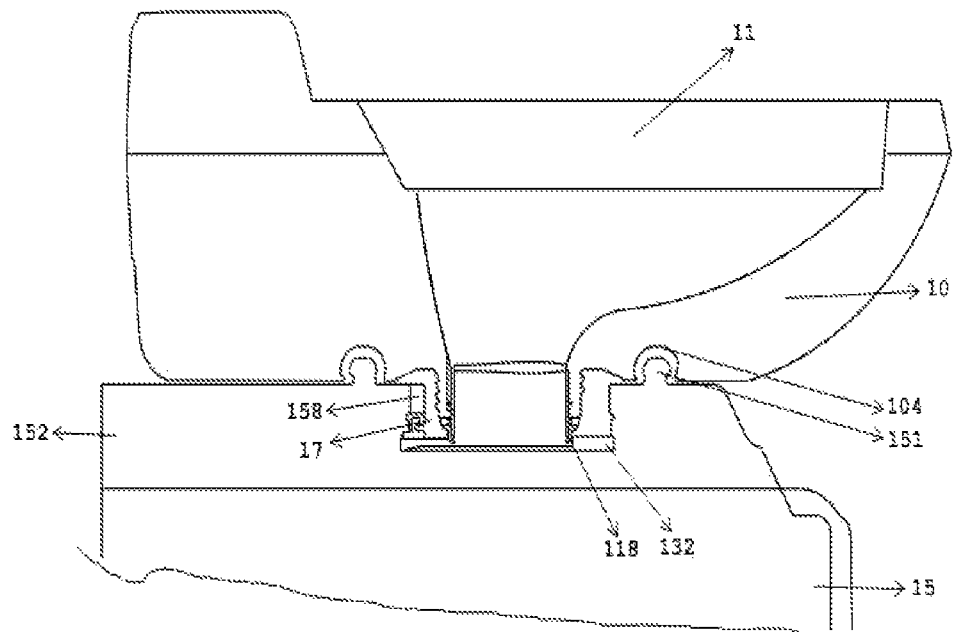
FIG. 6 is a structure diagram of the connection part between the flush toilet bowl and the cassette base.

As illustrated in the FIG. 1, FIG. 5 and FIG. 6, the invention further discloses a cassette portable toilet developed from the flush type toilet bowl, having the following technical solution: the lower end of the toilet bowl 10 is provided with a cassette base 15; the lower part of the toilet bowl 10 is provided with a concave water-drop structure 104 corresponding to a convex water-drop structure 151 on the cassette base 15 which is buckled with the concave water-drop structure 104 by the convex water-drop structure 151; the middle part of the cassette base 15 is provided with a hole with a shaft shoulder 158; an expanded compression ring 131 is formed under the shaft shoulder 158; a compression ring 171 is formed out of the nut 17 which locks the expanded compression ring 131 on the shaft shoulder 158 via the compression ring 171 so as to perform the fixed stable connection and mutual rotation between the cassette base 15 and the toilet bowl 10; the bottom part of the cassette base 15 hole is provided with a sliding rail 132; one side of the cassette base 15 is provided with an opening 152 installed with a waste holding tank 16 therein; the upper middle part of the waste holding tank 16 is provided with a sealing valve 12 equipped with an eave-type valve ring 121 that inserted in the sliding rail 132 and matched with the sliding rail 132 in sealing; the inner cavity of the valve ring 121 is matched with the J-shaped sealing ring 118, forming the cassette portable toilet. Besides the caravans, the cassette portable toilet can also be used in the outdoors, the hospital, the mine, the camping, the ship, the military camp, the storehouse and the house without water and electricity in good service.

Figure 7:
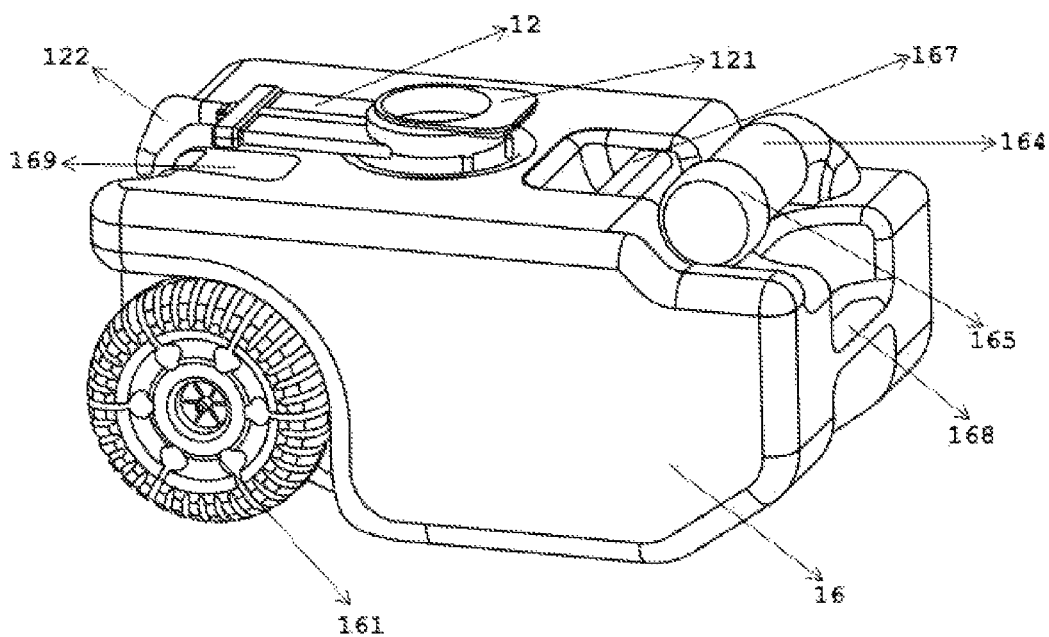
FIG. 7 is a structure diagram of the waste holding tank.

As illustrated in the FIG. 5 and FIG. 7, the sealing valve 12 is provided with a handle 122 dropping down for the gravity thereof and controlling the opening/closing of the sealing valve 12; the cassette base 15 is provided with an opening window 153 on the upper part opposite to the opening, and the handle 122 is extended out from the opening window 153.

The waste holding tank 16 is provided with a rotary pour spout 164 and a spout cap 165.

The waste holding tank 16 is provided with an upper handle 167 and a middle handle 168.

The waste holding tank 16 is provided with wheels 161.

The waste holding tank 16 is provided with a waste level indicator and an air release valve assembly 169.

Figure 8:
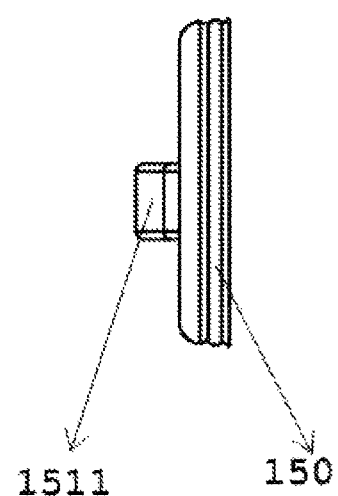
FIG. 8 is a structure diagram of the cassette base door.

As illustrated in the FIG. 5 and FIG. 8, the opening 152 of the cassette base features both a handle 1511 and a square metallic supporting frame for a strong rigidity.

The waste holding tank 16 and the cassette base 15 are formed by the one-step blow molding way. The base door 15 can be formed while forming the cassette base 15 or formed in cutting after the cassette base 15 and the base door 150 are formed integrally.

The invention can further develop a house-structured movable toilet having a hand sink therein.

Having described the preferred embodiment, it will become apparent that, for ordinary technical personnel in this technical field, various modifications can be made without departing from the scope of the invention as defined in the accompanying claims.

What is claimed is:

1. A flush type toilet bowl, comprising a toilet bowl, and a toilet inlay located in a lower portion of the toilet bowl, wherein the toilet inlay includes a drainage hose that is extended out from a toilet bowl drainage hose, the lower end of which is provided with an elastic ring, a clamping ring and a J-shaped sealing ring in sequence; threads are arranged out of the toilet bowl drainage hose and equipped with a nut for fixing the elastic ring, the clamping ring and the J-shaped sealing ring on the toilet bowl and pressing them on the end face of the drainage hose of the toilet inlay so as to seal the end face of the toilet inlay; a cavity containing the clean water is formed between the inner cavity on the lower part of the toilet bowl and the lower part of the toilet inlay; an annular platform of the toilet inlay is matched with an inner hole of the toilet bowl and is equipped with an aperture; a water inlet hose is arranged in the toilet bowl, one end of the water inlet hose is provided with a water jet nozzle, which is aligned with the aperture on the annular platform of the toilet inlay and is-extended out from the aperture on the annular platform of the toilet inlay, while the other end of the water inlet hose is provided with a four-way valve connected with the cavity containing clean water; a hand-pressed air pump is located on the rear part of the toilet bowl and connected with the four-way valve; next to the air pump is a button with which one can flush the toilet by pressing it easily.

2. The flush type toilet bowl according to claim 1, wherein the upper end of the nut is provided with an anti-loosening and non-return structure, while a non-return structure is located at the corresponding part on the bottom of the toilet bowl; the nut is fixedly connected with the toilet bowl by the anti-loosening and non-return structure and the non-return structure so as to keep tight all the time.

3. The flush type toilet bowl according to claim 1, wherein two standard bolt holes are reserved for a toilet seat and lid on the rear part of the toilet, which are fixed tightly on the toilet by the bolts.

4. The flush type toilet bowl according to claim 1, wherein the toilet bowl is formed by the one-step blow molding way, and the toilet inlay is made of injection molded the highly imitated ceramic abrasion-proof material.

5. A gravity flush portable toilet developed from the flush type toilet bowl according to claim 1, wherein the lower end of the toilet bowl is equipped with a gravity-flush base which is provided with a cavity hole, a side hole and a drainage hole in sequence from top to bottom; the toilet bowl drainage hose and the nut are sunk in the cavity hole equipped with an arc-shaped spherical valve therein that sealed with the J-shaped sealing ring; rotating shafts are formed on the lower part of the arc-shaped spherical valve and inserted in the side hole; one of the rotating shafts is connected with a pedal in crossed fixation; the pedal is installed with a returning spring, one end of which supports the end face of the rotating shaft while the other end supports the inner cavity surface of the side hole; the pedal is also provided with a shoulder supporting a stopping hook on the gravity-flush base.

6. A cassette portable toilet developed from the flush type toilet bowl according to claim 1, wherein the lower end of the toilet bowl is provided with a cassette base; the lower part of the toilet bowl is provided with a concave water-drop structure corresponding to a convex water-drop structure on the cassette base which is buckled with the concave water-drop structure by the convex water-drop structure; the middle part of the cassette base is provided with a hole with a shaft shoulder; an expanded compression ring is formed under the shaft shoulder; a compression ring is formed out of the nut which locks the expanded compression ring on the shaft shoulder via the compression ring so as to perform the fixed connection and mutual rotation between the cassette base and the toilet bowl; the bottom part of the cassette base hole is provided with a sliding rail; one side of the cassette base is provided with an opening door through which the waste holding tank can be put in or out easily; the upper middle part of the waste holding tank is provided with a sealing valve equipped with an eave-type valve ring that inserted in the sliding rail and matched with the sliding rail in sealing; the inner cavity of the valve ring is matched with the J-shaped sealing ring.

7. The cassette portable toilet according to claim 6, wherein the waste holding tank and the cassette base are formed by the one-step blow molding way, one side on the upper part thereof is configured with rotary pour spouts and spout caps while the other side is provided with a waste level indicator and an air release valve assembly, and the lower part is provided with wheels.

8. The cassette portable toilet according to claim 6, wherein the sealing valve is provided with a handle dropping down by the gravity thereof and controlling the opening/closing of the sealing valve; the cassette base is provided with an opening window on the upper part opposite to the opening, and the handle is extended out from the opening window.

9. The cassette portable toilet according to claim 6, wherein the waste holding tank is provided with an upper handle and a middle handle.

10. The cassette portable toilet according to claim 6, wherein the opening of the cassette base is a metallic supporting frame structure and provided with a base door equipped with a handle.

11. The flush type toilet bowl according to claim 2, wherein the toilet bowl is formed by the one-step blow molding way, and the toilet inlay is made of injection molded the highly imitated ceramic abrasion-proof material.

12. The flush type toilet bowl according to claim 3, wherein the toilet bowl is formed by the one-step blow molding way, and the toilet inlay is made of injection molded the highly imitated ceramic abrasion-proof material.

\* \* \* \* \*